No. 631,323. Patented Aug. 22, 1899.
E. P. PARSONS.
NAIL MAKING MACHINE.
(Application filed June 16, 1898.)
(No Model.) 5 Sheets—Sheet 1.

No. 631,323. Patented Aug. 22, 1899.
E. P. PARSONS.
NAIL MAKING MACHINE.
(Application filed June 16, 1898.)
(No Model.) 5 Sheets—Sheet 4.

ATTEST
R. B. Moser
H. E. Mudra

INVENTOR
Ernest P. Parsons
BY
H. T. Fisher
ATTY

No. 631,323. Patented Aug. 22, 1899.
E. P. PARSONS.
NAIL MAKING MACHINE.
(Application filed June 16, 1898.)
(No Model.) 5 Sheets—Sheet 5.
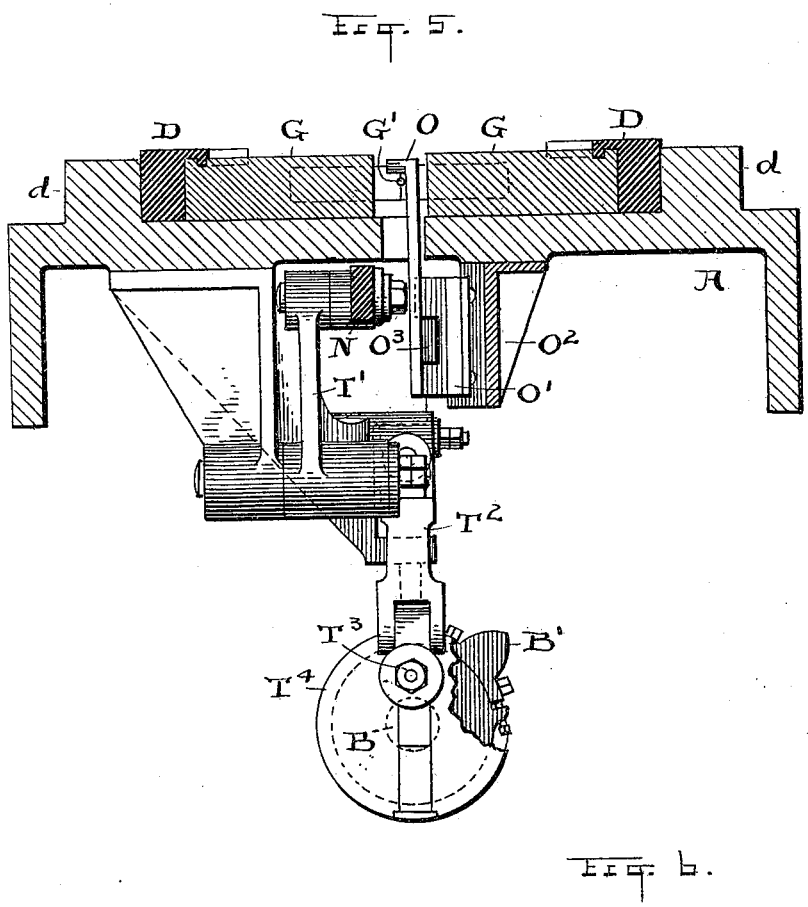
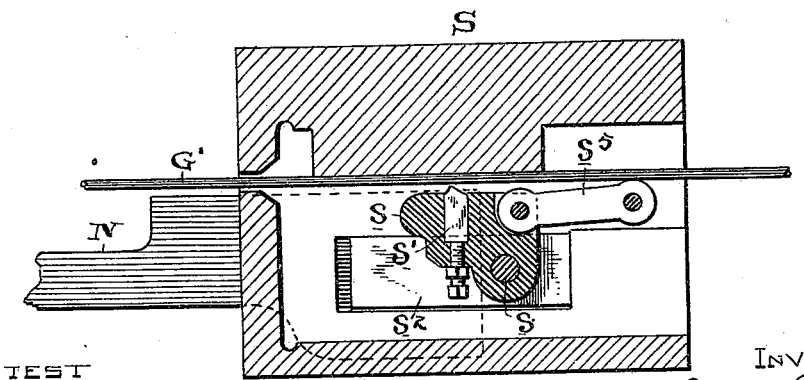
ATTEST
INVENTOR
Ernest P. Parsons
By H. T. Fisher Atty

UNITED STATES PATENT OFFICE.

ERNEST P. PARSONS, OF CLEVELAND, OHIO, ASSIGNOR OF ONE-HALF TO W. J. WHITE, OF SAME PLACE.

NAIL-MAKING MACHINE.

SPECIFICATION forming part of Letters Patent No. 631,323, dated August 22, 1899.

Application filed June 16, 1898. Serial No. 683,579. (No model.)

*To all whom it may concern:*

Be it known that I, ERNEST P. PARSONS, a citizen of the United States, residing at Cleveland, in the county of Cuyahoga and State of Ohio, have invented certain new and useful Improvements in Nail-Making Machines; and I do declare that the following is a full, clear, and exact description of the invention, which will enable others skilled in the art to which it appertains to make and use the same.

My invention relates to nail-making machines; and the invention consists in the construction and combination of parts, substantially as shown and described, and particularly pointed out in the claims.

Figure 1:
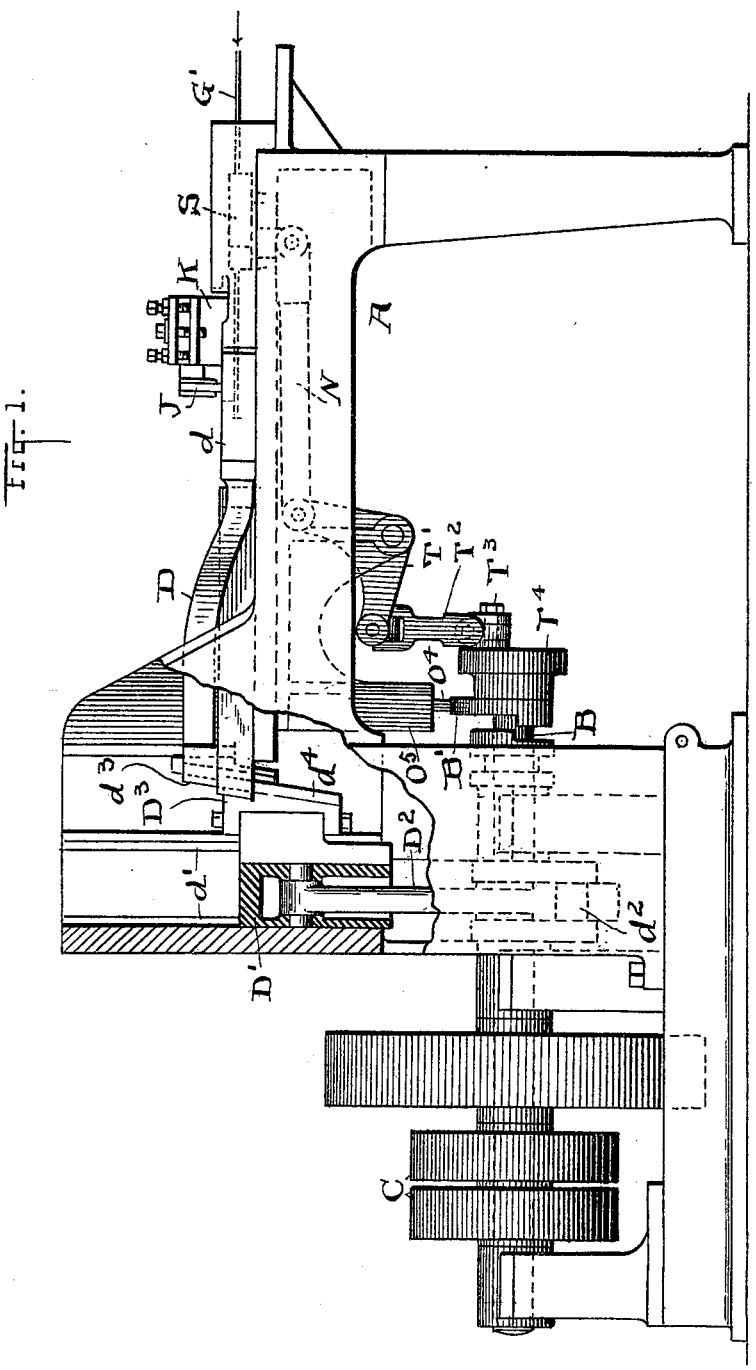
Figure 2:
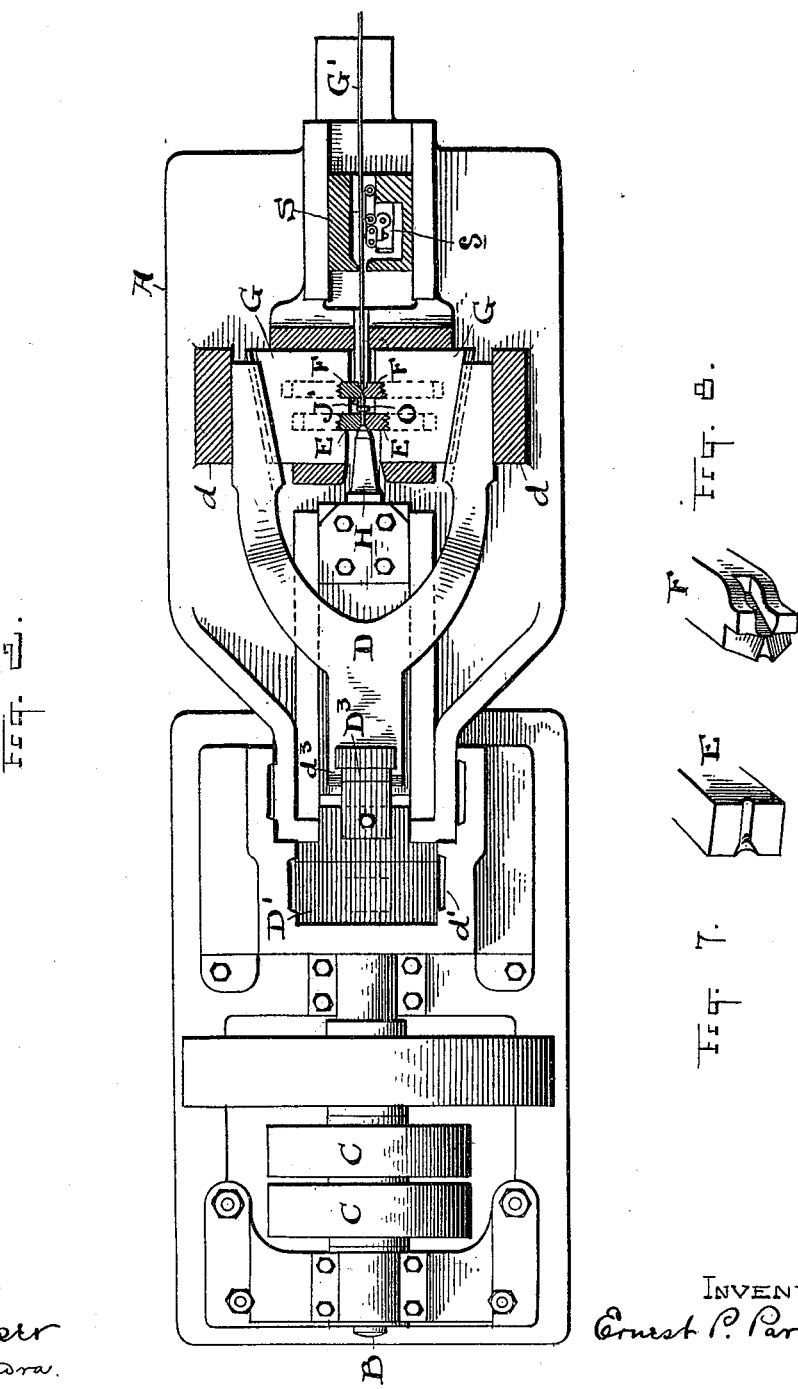
Figure 3:
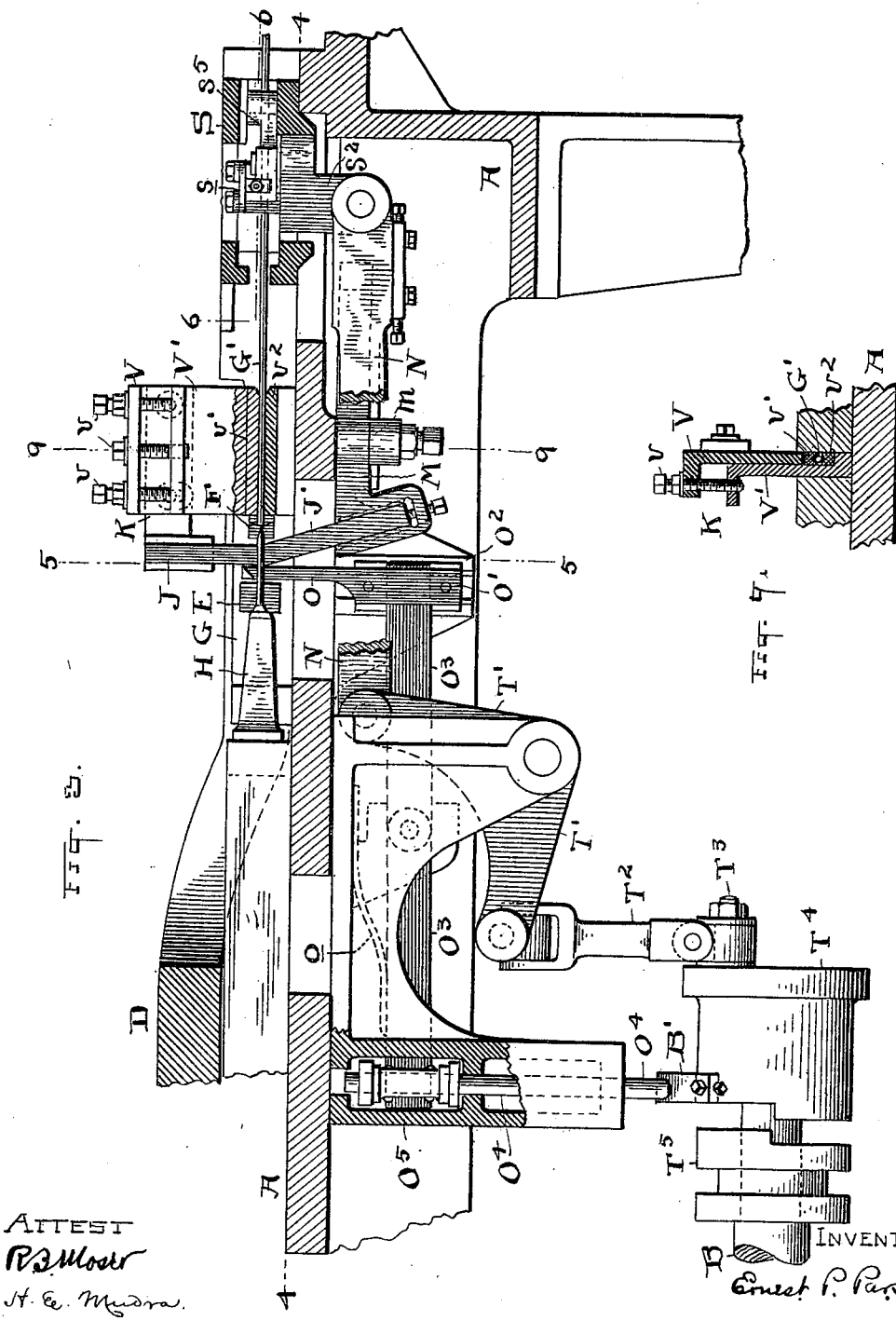
Figure 4:
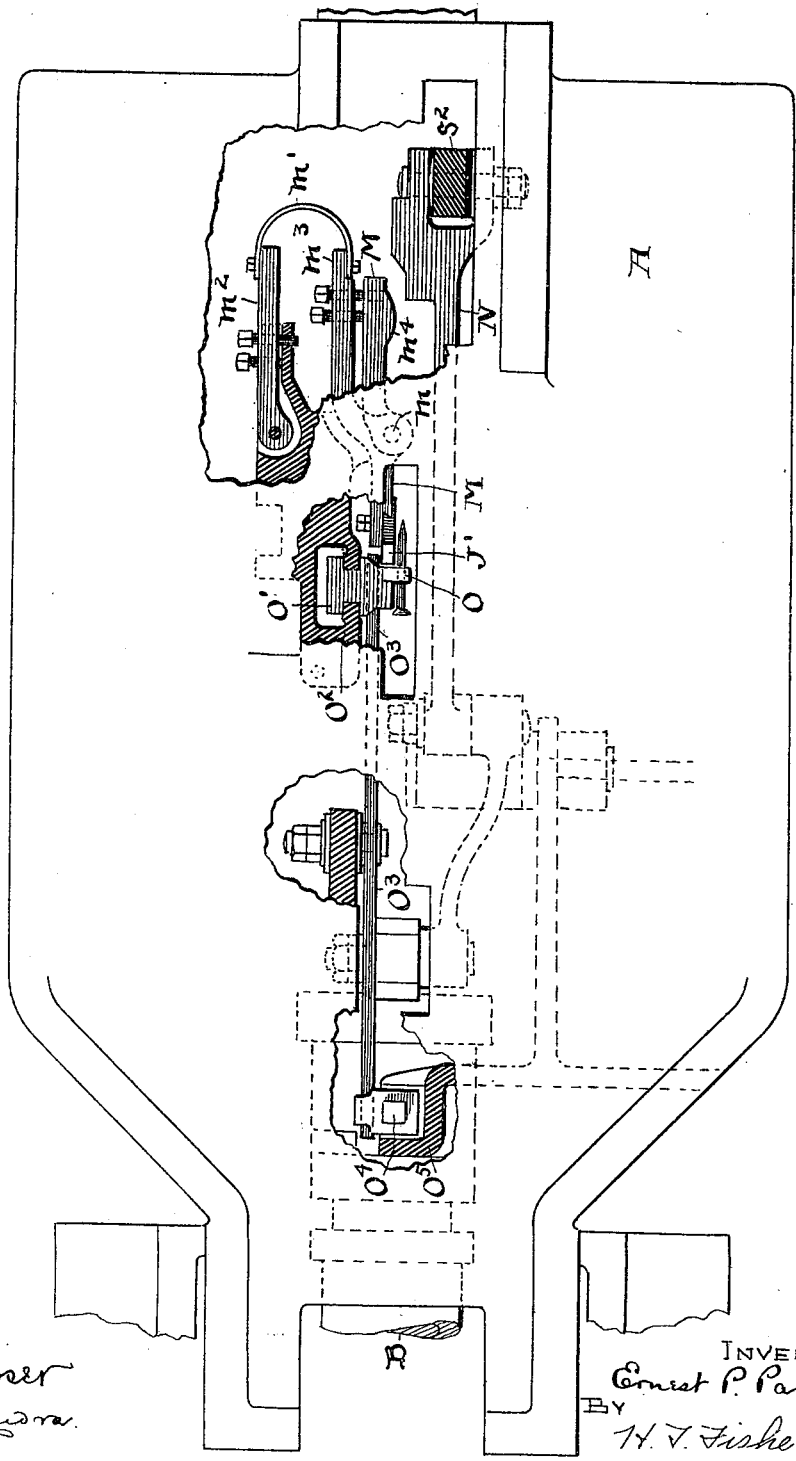

Referring to the accompanying drawings, Figure 1 is a side elevation of my improved machine. Fig. 2 is a plan view of the machine except that a part is horizontally sectioned on the line of the wire-feed and dies where the nail is produced, so as to disclose the order of operation at this point. Fig. 3 is a central longitudinal sectional elevation of the machine. Fig. 4 is a plan view on line 4 4, Fig. 3, but omitting some unessential parts at the side and front of the machine and illustrating the knocker mechanism for the finished nail, as hereinafter more fully described. Fig. 5 is a cross-section of the machine on a line corresponding to 5 5, Fig. 3, looking to the left. Fig. 6 is a plan view, in horizontal section, on the line of the wire, of the feed-head for the wire, taken substantially on line 6 6, Fig. 3, the head being shown here apart from other elements and enlarged. Figs. 7 and 8 are perspective views of the dies or die-sections for making the head and the point of the nail. Fig. 9 is an elevation of the guide mechanism for the wire just in advance of the dies on a line corresponding to 9 9, Fig. 3.

The machine shown in these several views is designed to produce nails of any desired size from a continuously-fed piece or strand of wire which is automatically fed to the machine as nail after nail is automatically produced in a perfectly-finished state in what may be termed a "single" operation or movement of the forming parts. To these ends the machine comprises a main supporting-frame A of any suitable pattern or kind, and B is the actuating-shaft, having suitable bands or pulleys C, through which the power is communicated to the machine.

D represents the yoke by which the dies are actuated, and to this end the yoke has a limited but sufficient back-and-forth sliding movement in the guides or supports $d$, Fig. 2. Motion is imparted to the yoke by a chain or any suitable mechanism reaching back to power-shaft B and comprising in this instance a vertically-sliding head D', traveling in guides $d'$ and actuated by pitman or connecting-rod $D^2$, with a crank or eccentric $d^2$, on shaft B.

On the front of head D' is secured a sub-head $D^3$, which has a vertically-inclined face or engaging surface, deepest at the top and receding from top to bottom and engaging a correspondingly-inclined surface in the extremity of the head of yoke D. Flanges $d^3$ on the yoke-head engage at the rear of head $D^3$, so that said heads are held together in easy-sliding relation one upon the other. Hence as heads D' $D^3$ travel up and down they operate the yoke D back and forth within its own fixed guides, thus causing the yoke D to open and close on the nail-forming dies, as will now appear.

There are two sets of dies E and F employed to produce a nail, or, rather, two dies of two parts or sections each, one set for producing the head and the other for producing the point of the nail. One member of each set is seen in Figs. 7 and 8 and the other members are duplicates or counterparts of these. Between the extremities of the yoke D are two separate heads G, carrying each two of the said dies, one of each set. All the dies are firmly but removably supported in said heads, and the space between the sets of dies fixes the length of the nail. Hence I can make a pair of heads G serve to carry dies variously spaced apart therein to form nails of varying lengths within certain limits. Otherwise different heads G may be introduced for nails of different lengths and in which the recesses for the dies would be spaced relatively farther apart than in case shorter nails were made.

The dies F have point-cutting edges, as well as being shaped to round the points in cross-section, and the dies E are countersunk to fashion the head into the desired shape. Feeding mechanism for the wire G', hereinafter described, carries the wire forward the length of a nail and then retires to take a new grip and feed forward the wire again in the same way. As this occurs the dies E and F are momentarily separated to drop the nail that has been made and to receive the stock for another, and then they are brought together again by the side pressure of yoke D, as hereinbefore described. It will be noticed that the extremities of the yoke D flare somewhat outwardly, while the edges of the heads D' engaged thereby taper inwardly in like degree or measure; but said heads are otherwise confined so as to have only a back-and-forth movement to and from the wire which passes centrally between them and the dies. Hence, in the operation, when the plunger H descends the yoke D is driven forward and its arms close gradually, but very forcibly, upon heads G, forcing the dies together to produce and complete the nail so far as the lateral action of the dies is concerned. Meantime, however, two other operations and parts enter into the completion of the product, consisting, first, of the plunger H, constructed to engage and upset the adjacent end of the wire or nail-blank to form the head of the nail. This plunger is actuated from the head D' the same, substantially, as the yoke D, but from the advanced inclined surface $d^4$ of head D' engaging the inclined opposed surface of the end of plunger H, said parts being so constructed and arranged as to force plunger H forward practically simultaneously with the forward movement of yoke D. It therefore follows that the instant the dies E and F are closed on the wire G' the plunger H participates in the completion of the nail by upsetting the head and more or less shaping the point in the dies F by reason of the thrust on the end of the wire to make the head. However, when the dies are separated and the wire is fed forward to make another nail there is apt to be such tremor or vibration in the extremity of the wire as may render the feed into the gripper-dies E uncertain, and thus possibly defeat the action of the machine. Therefore to steady and guide the wire between the dies or from dies F to dies E, thus bridging the intervening space, I employ the two guides J and J'. The upper guide J is stationary on the guide-head K, while the lower guide J' is supported on arm M, pivoted at $m$ on the bed of the main frame and arranged to swing into supporting position when engaging the wire and to swing back again when not so engaged. For the latter purpose, to throw arm M back and brace J' outward laterally, I employ a bow-spring $m'$, in this instance supported at its ends on two adjustable pieces $m^2$ and $m^3$, the latter connected with arm M. The actuation of arm M on its pivot $m$ is produced by a sliding contact from the head of the connecting-link N, Fig. 4, which has a rounded shoulder or projection adapted to press against the swell or projection $m^4$ on arm M and press said arm inward when link N is moved forward past the same. As said link moves back again to position, as in Fig. 4, the spring $m'$ is brought into action and through arm M throws the wire-guide J' laterally from beneath the nail, as in Fig. 4. Of course any equivalent mechanism to the foregoing which will afford an opening and closing intermediate guide for the wire or nail as it is being fed along may be adopted without departing from the spirit of the invention. These guides J J' open practically as soon as the wire has entered dies E. Now, having produced a finished nail and opened the dies, the nail is supposed to be instantly discharged, so that the parts shall be ready to repeat the operation. I have found, however, that prompt discharge or removal of the nail requires more than mere gravity or the opening of the dies, so that the nail may drop out, because often the nail will stick to the dies and not fall of its own accord. To obviate this objection and insure prompt discharge of the nail, I have adopted a knocker O, Figs. 3 and 5. The said knocker has preferably a hooked end to engage the nail and a downward pull or releasing movement by means of the head O', on which it is supported and which head is adapted to slide in guides on the bracket $O^2$, Fig. 5, fixed on the bottom of the bed of the main frame A. A lever $O^3$, pivoted near its middle portion, is vibrated up and down at the right time regularly to give a quick downward movement to the knocker, and to this end said lever is actuated by a curved projection B', fixed on shaft B and adapted to press against the rod $O^4$, having a yoke-shaped bearing-surface riding on said projection. The rod $O^4$ is supported in hanger $O^5$, engaging the outer end of lever $O^3$, which operates the knocker. The said mechanism is so timed with the other operative parts that the knocker O will always act just as the dies are opened, and the nail would naturally drop out if it were sure always to do so when released; but instead it is liable to adhere to one or the other of the gripper-dies and remain there unless forcibly removed. A spring $o$ restores lever $O^3$ to normal position. Again, any equivalent and sufficient knockout mechanism for the nail may be substituted for that shown without departing from the spirit of the invention.

Referring now to Figs. 2, 5, and 6, we see some of the details of the wire-feeding mechanism. These details or parts comprise, first of all, a sliding feed-head S, operating in guides on the main frame and adapted to move back and forth therein a greater or less distance, according to the length of the nail to be made. In this sliding head there is located a gripping-head $s$, having the outline substantially as shown and carrying the substantially chisel-shaped dog $s'$, in position to so set itself onto or against the wire G' as to make effective feeding engagement therewith. The gripping-head s is horizontally pivoted at $s^3$ on the part $s^2$ immediately beneath, and the line of actuating mechanism extends thence back to power-shaft B through connecting-bar N, bell-crank lever T', and pitman $T^2$. The bell-crank lever T' is pivoted on a bracket from the main frame and connected with a wrist-pin $T^3$ on the head $T^4$ on the extremity of shaft B and eccentric to its axis, and a clutch $T^5$ effects operative engagement between said head and shaft. A compensating link $s^5$, pivoted at one end on the feed-head S and at the other to the heel of gripping-head s, serves to modify the severe effect of the grip of dog s', which would otherwise occur, and also to give a measure of elasticity to the parts and thus insure a more efficient action.

In Fig. 9 I show a cross-section of the guide-head for the wire consisting of two parts V and V' and set-screws v, which serve to adjust said parts to take up possible wear and to adapt the guide to different sizes of wire. Hard-metal shoes v' and $v^2$ on said parts have opposite channels, forming together the passage for the wire, and by screws v these shoes may be separated or brought closer together. The dies F come just within the said guide-head and receive the wire directly from it.

What I claim as new, and desire to secure by Letters Patent, is—

1. In a nail-making machine, two sets of laterally-movable sectional dies for forming both ends of the nail at the same time, and guides for the wire between said sets of dies and directly in line therewith, and one of said guides being fixed, substantially as described.

2. In a nail-making machine, sectional dies to form the head of the nail and sectional dies to form the point of the nail, said sections being uniformly movable laterally, opposite guides for the wire between said dies and one of said guides movable, substantially as described.

3. In a nail-making machine, two sets of sectional nail-forming dies, said sections connected in pairs, two wire-guides between said dies, and a pivoted arm supporting one of said guides, substantially as described.

4. In a nail-making machine, dies in sets for forming the nail, a fixed guide and a movable guide for the wire between said sets of dies, a pivoted arm carrying the said movable guide and actuating mechanism for said arm comprising a spring to move the arm in one direction, substantially as described.

5. In a nail-making machine, two sets of nail-forming dies having each two laterally-movable sections, and a device between said sets of dies to dislodge the finished nail from the dies, said device having an up-and-down movement, and a pivoted lever controlling said device, substantially as described.

6. In a nail-machine, the two sets of dies, and the guides for the nail between the dies, one of said guides being stationary and the other movable, in combination with the knocker-arm between the said dies and guides, and a pivoted lever to actuate the said arm, substantially as described.

7. In a nail-machine, the feed-head for the wire, and a gripping-head therein having a dog to engage the wire and a support on which said gripping-head is pivoted independently of the said feed-head, and means to carry said gripping-head and dog away from the wire when it is fed backward, substantially as described.

8. In a nail-machine, the feed-head for the wire and guides in which said head slides, in combination with a gripping-head within said feed-head, a movable support on which the gripping-head is pivoted, and a link connection between the gripping-head and the feed-head, substantially as described.

9. In a wire-nail machine, two set of dies, and guides for the wire between said sets of dies consisting of a fixed upper guide and a laterally-movable lower guide, and the mechanism to feed the wire in the same horizontal plane as the said dies and guides, substantially as described.

10. In a wire-nail machine, two sets of dies for forming both ends of the nail at the same time, a two-part guide for the uncut wire arranged in advance of the dies and in line therewith, and means thereon to adjust said guides to adapt them to different sizes of wire, and a set of guides between said dies, one of which is fixed, substantially as described.

11. In a wire-nail machine, the two sets of dies for making the nail and means to open and close the dies laterally, in combination with a pair of guides for the wire above and below the same and located between said sets of dies, the upper guide being fixed and the lower guide movable laterally, substantially as described.

12. The dies for making the nails arranged in pairs with a space between them, in combination with wire-guides between said pairs consisting of a fixed upper guide and a laterally-movable lower guide, a horizontally-arranged pivoted arm carrying said movable guide at one end and means at its opposite end to actuate said arm, substantially as described.

Witness my hand to the foregoing specification this 18th day of March, 1898.

ERNEST P. PARSONS.

Witnesses:
H. T. FISHER,
R. B. MOSER.